United States Patent
Ingle et al.

(10) Patent No.: US 9,632,781 B2
(45) Date of Patent: Apr. 25, 2017

(54) VECTOR REGISTER ADDRESSING AND FUNCTIONS BASED ON A SCALAR REGISTER DATA VALUE

(71) Applicant: Qualcomm Incorporated, San Diego, CA (US)

(72) Inventors: Ajay A. Ingle, Austin, TX (US); Marc M. Hoffman, Mansfield, MA (US); Jose Fridman, Waban, MA (US); Lucian Codrescu, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 995 days.

(21) Appl. No.: 13/777,297

(22) Filed: Feb. 26, 2013

(65) Prior Publication Data

US 2014/0244967 A1    Aug. 28, 2014

(51) Int. Cl.
  G06F 9/30    (2006.01)
  G06F 9/38    (2006.01)
  G06F 9/345   (2006.01)
(52) U.S. Cl.
  CPC ........ *G06F 9/30105* (2013.01); *G06F 9/3013* (2013.01); *G06F 9/30018* (2013.01);
  (Continued)
(58) Field of Classification Search
  CPC .................... G06F 9/30018; G06F 9/30036
  See application file for complete search history.

(56) References Cited

U.S. PATENT DOCUMENTS 5,922,066 A     7/1999  Cho et al.
5,933,650 A *   8/1999  van Hook ............... G06F 5/00
                                                  712/2
(Continued)

FOREIGN PATENT DOCUMENTS

CN    1894659 A    1/2007
GB    2382673 A    6/2003
(Continued)

OTHER PUBLICATIONS

International Preliminary Report on Patentability for Patent Application No. PCT/US2014/017713, mailed Apr. 30, 2015, 11 pages.
(Continued)

*Primary Examiner* — Andrew Caldwell
*Assistant Examiner* — Michael Metzger
(74) *Attorney, Agent, or Firm* — Withrow & Terranova, PLLC (57) ABSTRACT

Techniques are provided for executing a vector alignment instruction. A scalar register file in a first processor is configured to share one or more register values with a second processor, the one or more register values accessed from the scalar register file according to an Rt address specified in a vector alignment instruction, wherein a start location is determined from one of the shared register values. An alignment circuit in the second processor is configured to align data identified between the start location within a beginning Vu register of a vector register file (VRF) and an end location of a last Vu register of the VRF according to the vector alignment instruction. A store circuit is configured to select the aligned data from the alignment circuit and store the aligned data in the vector register file according to an alignment store address specified by the vector alignment instruction.

23 Claims, 7 Drawing Sheets

(52) U.S. Cl.
CPC ...... *G06F 9/30032* (2013.01); *G06F 9/30036* (2013.01); *G06F 9/30109* (2013.01); *G06F 9/30163* (2013.01); *G06F 9/345* (2013.01); *G06F 9/3885* (2013.01)

(56) References Cited

U.S. PATENT DOCUMENTS

| | | | |
|---|---|---|---|
| 7,219,212 B1 | 5/2007 | Sanghavi et al. | |
| 7,620,797 B2 | 11/2009 | Gonion et al. | |
| 7,793,077 B2 | 9/2010 | Van Hook et al. | |
| 7,865,693 B2 | 1/2011 | Eichenberger et al. | |
| 2003/0163667 A1* | 8/2003 | Barlow | G06F 15/8076 712/7 |
| 2005/0125640 A1* | 6/2005 | Ford | G06F 9/30032 712/225 |
| 2006/0095521 A1 | 5/2006 | Patinkin | |
| 2008/0140750 A1* | 6/2008 | Kershaw | G06F 7/768 708/490 |
| 2009/0037694 A1 | 2/2009 | Luick et al. | |
| 2009/0172348 A1* | 7/2009 | Cavin | G06F 9/30036 712/4 |
| 2012/0059998 A1 | 3/2012 | Alexandron et al. | |
| 2012/0060015 A1 | 3/2012 | Eichenberger et al. | |
| 2012/0144089 A1 | 6/2012 | Hall et al. | |
| 2012/0254589 A1* | 10/2012 | Corbal San Adrian | G06F 9/30018 712/204 |

FOREIGN PATENT DOCUMENTS

| | | |
|---|---|---|
| GB | 2444811 A | 6/2008 |
| WO | 2005057405 A1 | 6/2005 |

OTHER PUBLICATIONS

International Search Report and Written Opinion for Patent Application No. PCT/US2014/017713, mailed Aug. 22, 2014, 24 pages.
Partial International Search Report—PCT/US2014/017713—ISA/EPO—May 27, 2014.
Written Opinion for PCT/US2014/017713, mailed Feb. 2, 2015, 6 pages.

* cited by examiner

VECTOR REGISTER ADDRESSING AND FUNCTIONS BASED ON A SCALAR REGISTER DATA VALUE

FIELD OF THE DISCLOSURE

The present disclosure relates generally to the field of data alignment and more particularly to efficiently accessing a double width data value at an unaligned memory address.

BACKGROUND

Many portable products, such as cell phones, laptop computers, personal data assistants (PDAs) and the like, utilize a processing system that executes programs, such as communication and multimedia programs. A processing system for such products may include multiple processors, multi-thread processors, complex memory systems including multi-levels of caches for storing instructions and data, controllers, peripheral devices such as communication interfaces, and fixed function logic blocks configured, for example, on a single chip.

Data to be received in and to be operated on by a processor are values of information that are quantized in binary form according to a level of measurement precision required to represent the information. Standard classes of data or data types are grouped according to a number of binary bits, such as integer values represented as 8-bit bytes, 16-bit half-words, 32-bit words, 64-bit double-words, 128-bit quad-words and floating point values represented as 32-bit single precision values, 64-bit double precision values and the like. Many processors support multiple data types and require an efficient way of accessing data for processing. Generally, each datum is assigned an address representing a location in a memory system of a processor. In many memory systems, the memory is organized according to a standard precision bit width, such as 32-bits allowing four bytes, two half-words or one word to be stored in each 32-bit location. In other processing systems, such as those associated with a single instruction multiple data (SIMD) processor of packed data sets and a vector processor, such as a SIMD vector processor, the memory system may be organized around larger bit widths based on groups of standard precision values, such as widths of 256-bits, 512-bits, or the like. For example, in a memory system having 512-bit width memory locations, each location may store sixty four bytes or thirty two half-words or sixteen words or eight double-words or four quad-words. Such large width memory locations may be located, in a SIMD vector processor's register file. In such systems, data alignment to addressable memory locations is important for efficient access using standard processor memory access instructions. However, such data alignment is not necessarily easy to achieve. For example, data structures may not be a multiple of a memory location's width. Also, there is no guarantee that a data structure of any size may start or end properly aligned. Thus, efficiently accessing unaligned data is a difficult problem.

SUMMARY

Among its several aspects, the present disclosure recognizes that it is advantageous to provide more efficient methods and apparatuses for aligning data. To such ends, an embodiment of the invention addresses a method for executing a vector alignment instruction. A start location on a first processor is accessed from a register in a scalar register file that is shared between the first processor and a second processor. On the second processor, a set of data values that begins at the start location within a register of a vector register file (VRF) is aligned to be stored as a set of aligned data values at a target register of the VRF.

Another embodiment addresses a method for executing a vector align and operate instruction. A start location generated on a first processor is accessed from a register in a scalar register file that is shared between the first processor and a second processor. On the second processor, a set of data values that begins at the start location within a register of a vector register file (VRF) is aligned to generate a set of aligned data values. The aligned data values are operated on according to the vector align and operate instruction to generate a result stored at a target register of the VRF.

Another embodiment addresses a method for executing a vector mask alignment instruction. A mask and a start location generated on a first processor are accessed from a first register and a second register in a scalar register file that is shared between the first processor and a second processor. The mask is applied to identify a set of registers of a vector register file (VRF) on the second processor according to enabled bits in the mask. On the second processor a set of data values that begins at the start location within the identified set of registers of the vector register file (VRF) is aligned to be stored as a set of aligned data values at a target set of registers of the VRF.

Another embodiment addresses an apparatus for executing a vector alignment instruction. A scalar register file associated with a first processor is configured to share one or more register values with a second processor, the one or more register values accessed from the scalar register file according to an Rt address specified in a vector alignment instruction. An alignment circuit in the second processor is configured to align data identified within a plurality of registers of a vector register file (VRF) according to the vector alignment instruction and an alignment start location determined from the one or more register values. A store circuit is configured to select the aligned data from the alignment circuit and store the aligned data in the vector register file according to an alignment store address specified by the vector alignment instruction.

Another embodiment addresses a computer readable non-transitory medium encoded with computer readable program data and code. A start location on a first processor is accessed from a register in a scalar register file that is shared between the first processor and a second processor. On the second processor a set of data values that begins at the start location within a register of a vector register file (VRF) is aligned to be stored as a set of aligned data values at a target register in the VRF.

A further embodiment addresses an apparatus for executing a vector alignment instruction. Means is utilized for sharing one or more register values accessed from a scalar register file in a first processor with a second processor, the one or more register values accessed according to an Rt address specified in a vector alignment instruction, wherein a start location is determined from one of the shared register values. Means is utilized for aligning data in the second processor, the data identified between the start location within a beginning Vu register of a vector register file (VRF) and an end location of a last Vu register of the VRF according to the vector alignment instruction. Means is utilized for selecting the aligned data from the alignment circuit and storing the aligned data in the vector register file according to an alignment store address specified by the vector alignment instruction.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Various aspects of the present invention are illustrated by way of example, and not by way of limitation, in the accompanying drawings, wherein.

DETAILED DESCRIPTION

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well known structures and components are shown in block diagram form in order to avoid obscuring the concepts of the present invention.

To address data alignment problems and the efficient generation of a scalar start address value, an alignment type instruction is created in the instruction set architecture (ISA) of the vector processor. The start address of a packed data element stored in a wide memory location such as a 512-bit or 1024-bit vector register in a vector register file of a vector processor may be, for example at any byte location within the vector register. The start address for such a data structure stored in memory or a register file is generally generated more efficiently on a general purpose (GP) processor as compared to generating the single start address value on the vector processor which processes the large packed data elements. In a system having a GP processor and a vector coprocessor, the sharing of such a start address value could be time consuming and impact the performance of the system. By organizing a processor complex to include a GP processor and a vector coprocessor coupled through a shared data port as described herein, the start address may be generated on the GP processor and shared or transferred in an efficient manner to the vector processor which handles the data alignment operations without having an impact on system performance. While the alignment type instruction is primarily used for alignment purposes it may also be extended to include alignment plus function type instructions of varying levels of complexity. A C-bit Vd=valign (Vu@Rt) instruction and a 2C-bit Vdd=valign(Vu@RT) instruction are included in the instruction set architecture (ISA) of the SIMD vector coprocessor.

Figure 1:
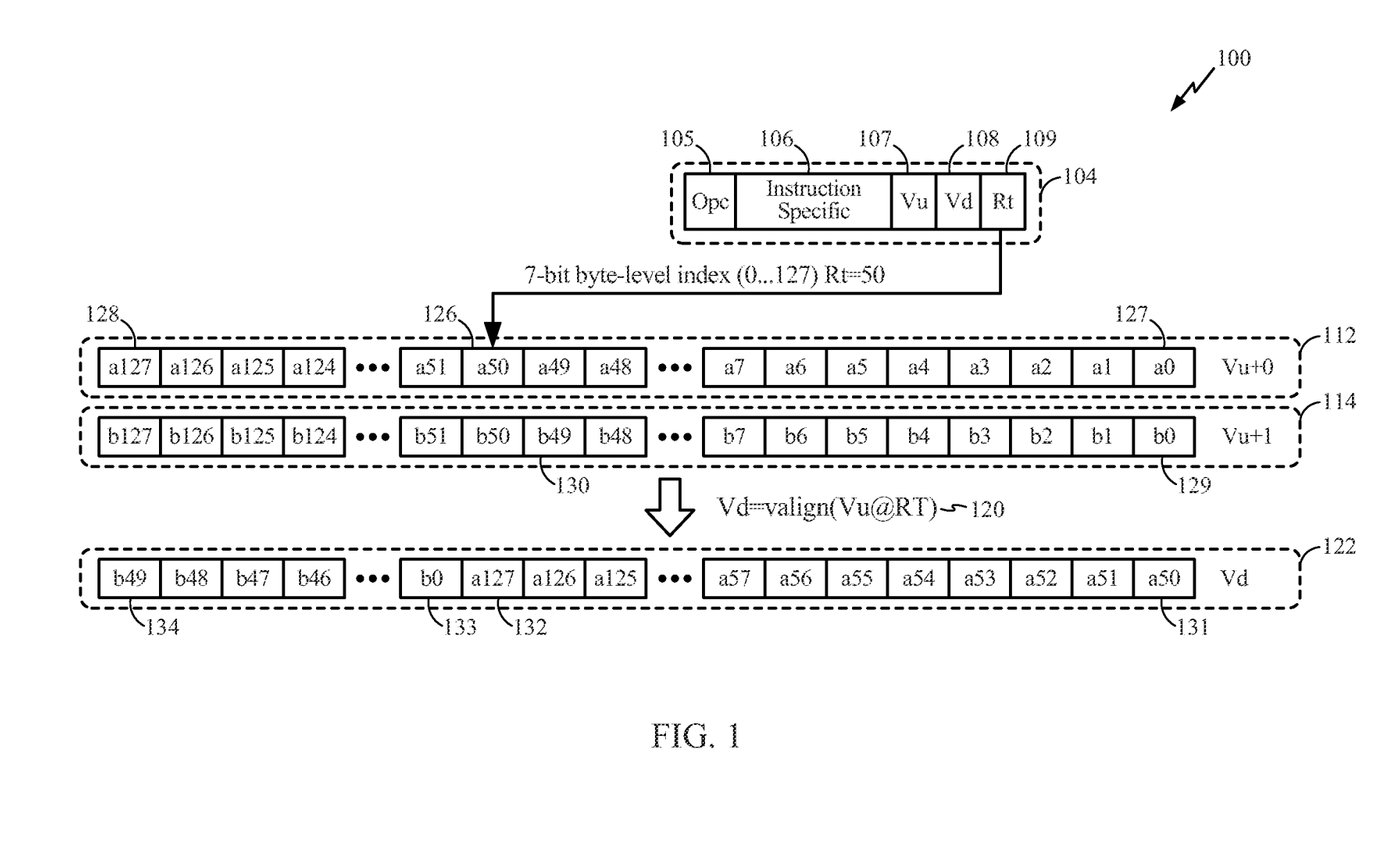
FIG. 1 illustrates an embodiment of a first alignment function.

FIG. 1 illustrates an embodiment of a first alignment function 100 that may be advantageously employed. FIG. 1 illustrates the operation of a 1 kb-word VRF Vd=valign (Vu@Rt) instruction 104 which is an instruction that requires data from two processors, wherein the Rt field identifies a register whose stored value is obtained from a register file in the coupled GP processor and the other fields are interpreted in the coprocessor. A vector coprocessor is organized with a B×C-bit vector register file (VRF), where B=32 and C-bit=1024-bit (1 kb). The Vd=valign(Vu@Rt) instruction 104 comprises an opcode (Opc) 105, an instruction specific field 106, a vector register address source field Vu 107, a vector register address destination field Vd 108, and a GP processor start location register address source field GP Rt 109. The Vu 107 value may be used as a direct address register value or, alternatively, the Vu register of the VRF may be indirectly identified by a value stored in a vector unit base register. Three C-bit vector registers are involved in execution of the alignment instruction. Two source operand registers are Vu 112 and Vu+1 114 and a result destination register is Vd 122.

When the Vd=valign(Vu@Rt) instruction 104 is received and decoded, the GP processor register GP Rt 109 is accessed from the register file in the GP processor. For example, bits [6:0] of a GP Rt are read and passed through a data port to the vector coprocessor. The GP Rt[6:0] value in this exemplary scenario is a decimal value of 50 representing the byte start location "a50" 126 in the Vu register 112 for the alignment function. The byte start location "a50" 126 may also be referenced as an offset from byte "a0" 127. In operation, data elements from the byte start location "a50" 126 to byte "a127" 128 are selected from the Vu register 112 and byte "b0" 128 to the Rt[6:0]-1 byte "b49" 130 are selected from the Vu+1 register 114. Executing the Vd=valign(Vu@Rt) instruction 104 causes the bytes "a50" 126 to "a127" 128 to be moved to the bytes beginning at the "0" position 131 to the byte "77" position 132 in the Vd register 122. Also, the execution of the alignment instruction causes the bytes "b0" 129 to the Rt[6:0]-1 byte "b49" 130 to be moved to the bytes beginning at the "78" position 133 to the byte "127" position 134 in the Vd register 122. This can also be viewed as the byte at the Rt[6:0] position from the Vu register 112 becoming the least significant byte of the Vd register 122 and the byte at the Rt[6:0]-1 position from the Vu+1 register 114 becomes the most significant byte of the Vd register 122.

Figure 2A:
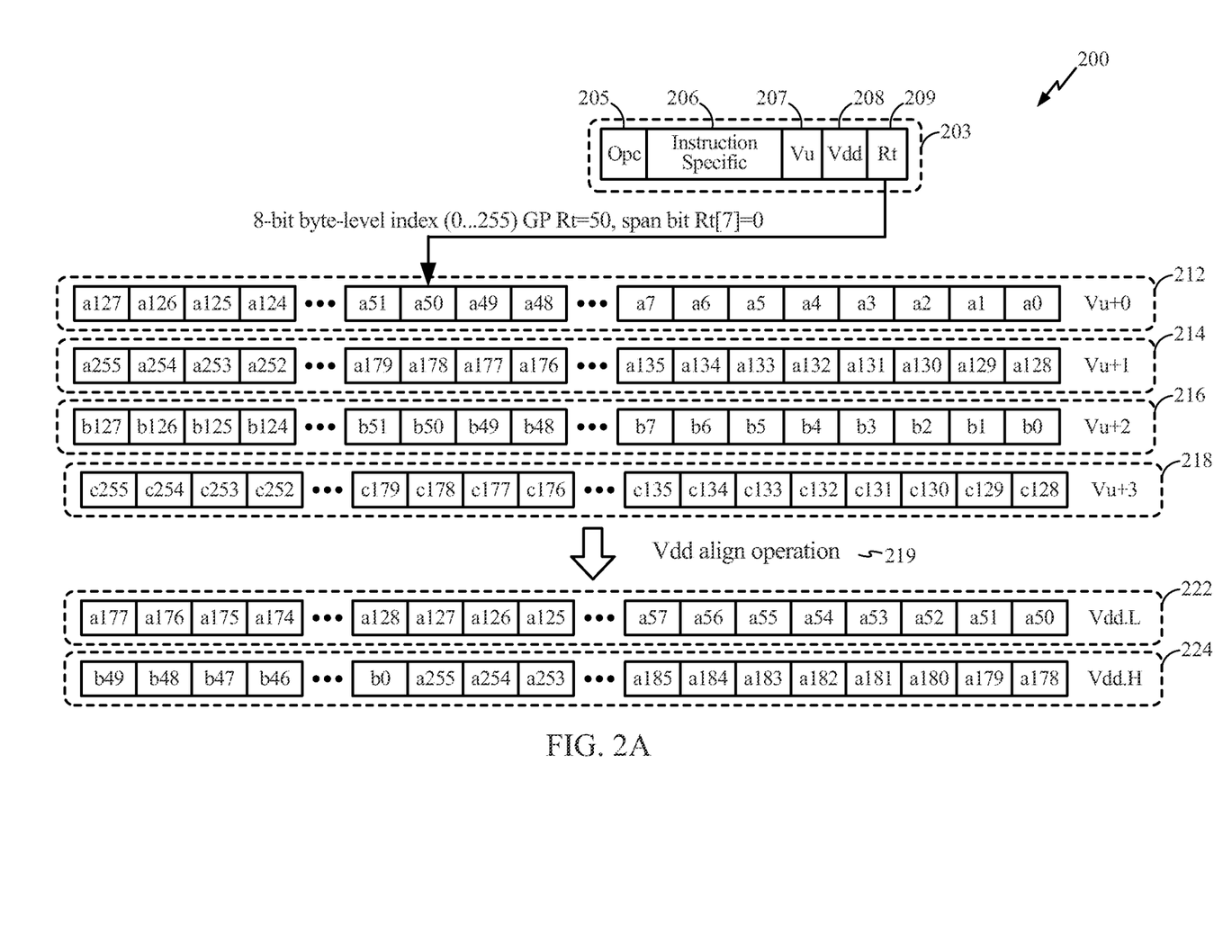
FIGS. 2A and 2B illustrate embodiments of a second alignment function.
Figure 2B:
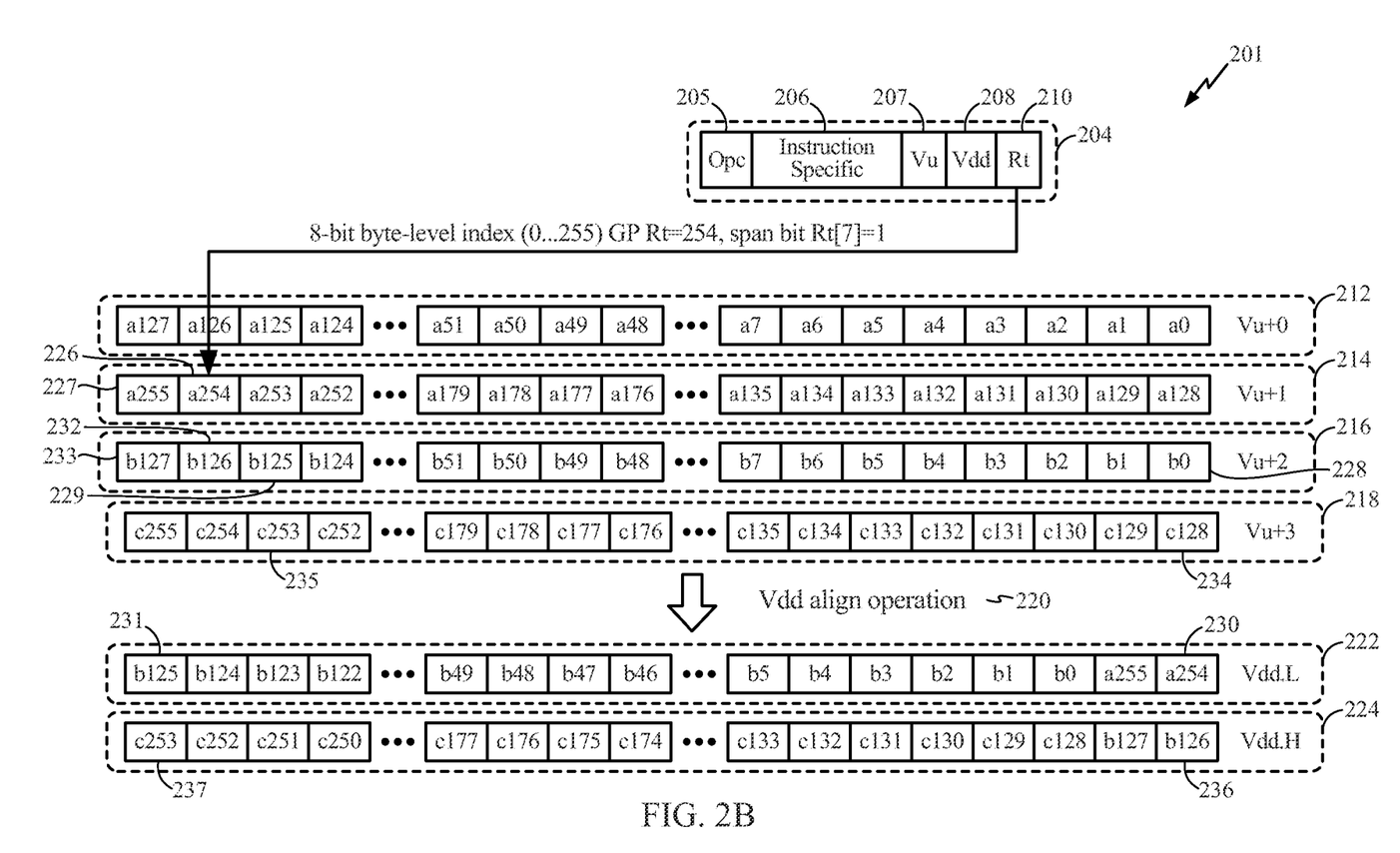

FIGS. 2A and 2B illustrate embodiments of a second, alignment function 200 and 201, respectively, that may be advantageously employed. FIG. 2A shows an exemplary alignment operation 219 when the span bit, such as Rt[7] is a zero and Rt[6:0] is equal to decimal 50. FIG. 2A illustrates the operation of a 2 kb-word. VRF Vdd=valign(Vu@RT) instruction 203 which is an instruction that requires data from two processors, wherein a GP Rt value is obtained, from a register file at the GP Rt address (data@Rt) 334 in the coupled GP processor and the other fields the instruction 203 are interpreted in the coprocessor. The vector coprocessor is organized with a B×C-bit vector register file (VRF), where B=32 and C-bit=1024-bit (1 kb). The Vdd=valign(Vu@Rt)

instruction 203 comprises an opcode (Opc) 205, an instruction specific field 206, a vector register address source field Vu 207, a vector register address destination field Vdd 208, and a GP processor start location register address source field GP Rt 209. The Vu 207 value may be used as a direct address register value or, alternatively, a register of the VRF may be indirectly identified by a value stored, in a vector unit (Vu) base register. Six C-bit vector registers are involved in execution of the second alignment instruction. Four source operand registers are Vu 212, Vu+1 214, Vu+2 216, and Vu+3 218 and two result destination registers are Vdd.L 222 for the lower 128 bits of the result and Vdd.H 224 for the higher 128 bits of the result.

The span bit is bit seven of the Rt value read from the GP register file at the GP Rt address (data@Rt) 334 or in an alternative embodiment the span bit is the most significant bit of the GP Rt field 209 in FIG. 2A and 210 of FIG. 2B. The span bit indicates a starting address that may span a double register set of packed data elements, which in this exemplary case is 256 byte elements. The Vdd=valign (Vu@RT) instruction allows a double alignment as compared to the alignment operation of the Vd=valign(Vu@RT) instruction illustrated in FIG. 1. The exemplary Vdd alignment function 200 selects a subset of registers from a group of four registers Vu 212, Vu+1 214, Vu+2 216, and Vu+3 218 dependent upon the span bit. For the exemplary Vdd alignment operation 220 of FIG. 2A, the span bit is a zero and the correct selected source registers are Vu 212, Vu+1 214, and Vu+2 216.

Executing the Vdd=valign(Vu@RT) instruction 203 for a span bit, such as Rt[7]=0, causes the bytes from offset Rt[6:0] element a50 to Byte-127 element a127 from the Vu register 212 and Byte-0 element a128 to offset Rt[6:0]-1 element a177 from the Vu+1 register 214 to be selected and then moved, such that the Vu byte at offset Rt[6:0] element a50 becomes the least significant byte of the Vdd.L register 222 and the Vu+1 byte at offset Rt[6:0]-1 element a177 becomes the most significant byte of the Vdd.L register 222. Also, the execution of the alignment instruction causes the bytes from offset Rt[6:0] element a178 to Byte-127 element a255 from the Vu+1 register 214 and Byte-0 element b0 to offset Rt[6:0]-1 element b49 from the Vu+2 register 216 to be selected and then moved, such that the Vu+1 byte at offset Rt[6:0] element a178 becomes the least significant byte of the Vdd.H register 224 and the Vu+2 byte at offset Rt[6:0]-1 element b49 becomes the most significant byte of the Vdd.H register 224.

FIG. 2B also shows an exemplary alignment function 201 when the span bit, such as Rt[7] is a one and Rt[6:0] is equal to decimal 254. The exemplary Vdd alignment function 201 selects a subset of registers from a group of four registers Vu 212, Vu+1 214, Vu+2 216, and Vu+3 218 dependent upon the span bit. For the exemplary Vdd alignment operation 220, the span bit is a one and the correct set of source registers to be selected are Vu+1 214, Vu+2 216, and Vu+3 218. Thus, the span bit allows an appropriate set of registers to be selected without use of additional program instructions for start address management and source register selection.

Executing the Vdd=valign(Vu@RT) instruction 204 for Rt[7]=1 causes the bytes from offset Rt[6:0] 226 to Byte-127 227 from the Vu+1 register 214 and Byte-0 228 to byte at offset (Rt[6:0]-1)=253 229 from the Vu+2 register 216 to be selected and then moved, such that the Vu+1 byte at offset Rt[6:0] 226 becomes the least significant byte 230 of the Vdd.L register 222 and the Vu+2 byte at offset Rt[6:0]-1 229 becomes the most significant byte 231 of the Vdd.L register 222. Also, the execution of the alignment instruction causes the bytes from offset Rt[6:0] 232 to Byte-127 233 from the Vu+2 register 216 and Byte-0 234 to offset (Rt[6:0]-1)=253 235 from the Vu+3 register 218 to be selected and then moved, such that the Vu+2 byte at offset Rt[6:0] 232 becomes the least significant byte 236 of the Vdd.H register 224 and Vu+3 byte at offset Rt[6:0]-1 235 becomes the most significant byte 237 of the Vdd.H register 224. The Vdd=valign(Vu@RT) instruction 204 advantageously allows double the span of unaligned data to be aligned as compared to the alignment capacity of the Vd=valign (Vu@RT) instruction 104. By using Rt[7], the double alignment span is achieved without having the software explicitly manage the location of the GP Rt pointer in the 0 to 255 byte range.

Figure 3A:
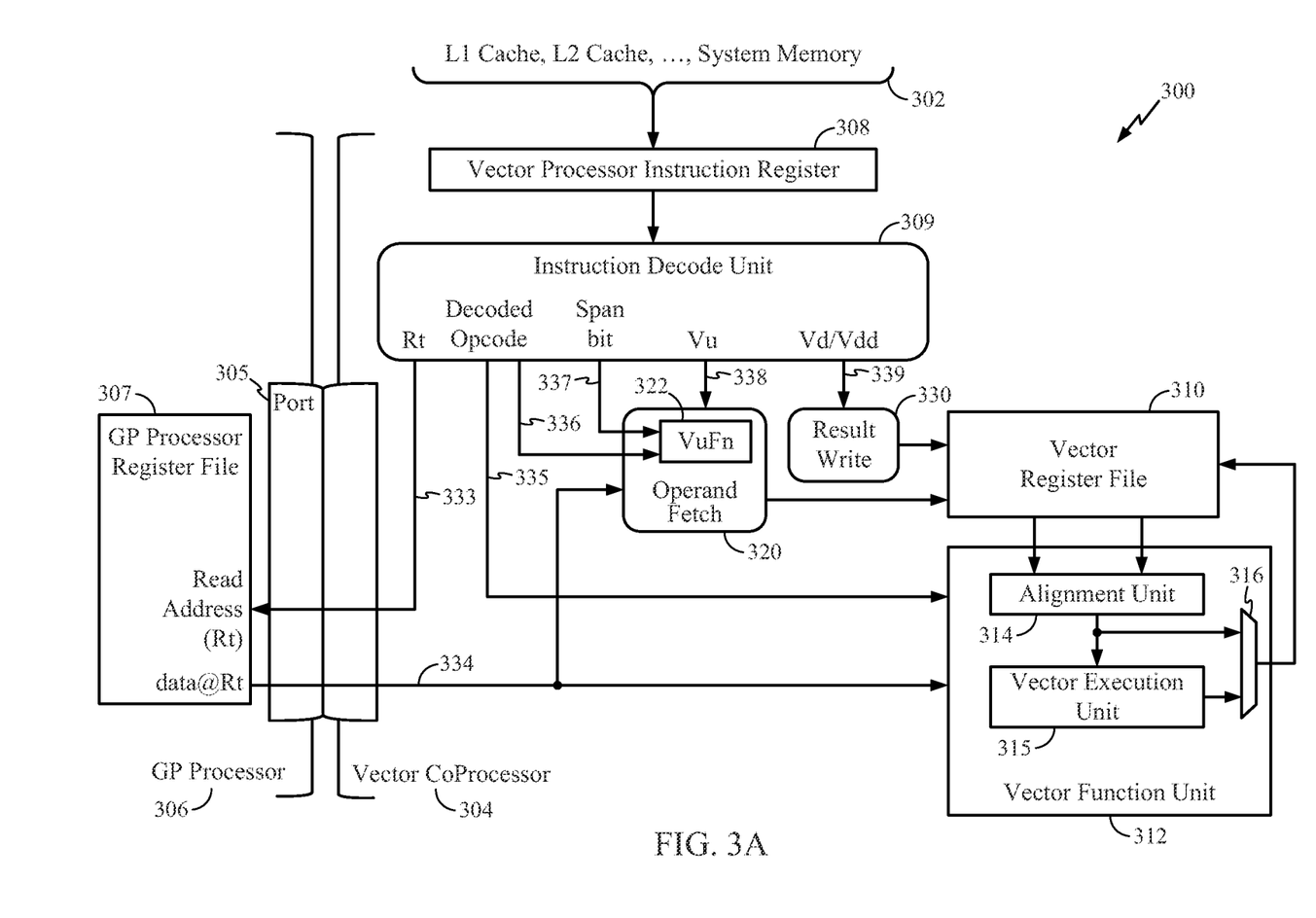
FIG. 3A illustrates an embodiment of a first alignment subsystem.

FIG. 3A illustrates an embodiment of a first alignment subsystem 300 that may be advantageously employed. The first alignment subsystem 300 includes a memory hierarchy 302, such as a level 1 (L1) cache, a L2 cache, L3 cache, system memory, a vector coprocessor 304, and a general purpose (GP) processor 306. The GP processor 306 includes a GP processor register file 307 and a portion of a data port 305 between the GP processor 306 and the coprocessor 304. The coprocessor 304 includes a vector processor instruction register 308, an instruction decode unit 309, a vector register file (VRF) 310, a vector function unit 312, an operand fetch unit 320, a result write unit 330, and a portion of the data port 305 between the coprocessor 304 and the GP processor 306. Contents of the GP register file 307 are shared between the GP processor 306 and the coprocessor 304 across the data port 305. The vector function unit 312 includes an alignment unit 314, a vector execution unit 315, and a store circuit 316 to select either results from the alignment unit 314 or results from the vector execution unit 315 and store the selected result in the VRF 310. The VRF 310 may be configured as a B×C-bit register file, where B=32 entries and C-bit=1024-bit (1 kb), for example.

With the first alignment subsystem 300 in operation, an alignment instruction, such as alignment instructions 104 of FIG. 1, 203 of FIG. 2A, or 204 of FIG. 2B, is received in the vector instruction register 308. The received alignment instruction is decoded in the instruction decode unit 309 producing a plurality of decoded results which include a GP Rt address field 333, a decoded operation code 335, a Vu register address 338, and a Vd or Vdd register address or addresses 339.

A span method, as described with regard to FIG. 2A or FIG. 2B, uses bit seven of the Rt value read from the GP register file at the GP Rt address (data@Rt) 334 or in an alternative embodiment the span bit is the most significant bit of the GP Rt field 209 in FIG. 2A and 210 of FIG. 2B. The lower bits of Rt[6:0] indicate an offset from an VRF address stored in a vector unit (VU) base register in operand fetch unit 320. The register based span bit Rt[7] read from the GP register file at the GP Rt address (data@Rt) 334 indicates the span of the VRF to choose based on the VU base register. For example, with Rt[7]=0, the Vu, Vu+1, Vu+2 registers would be selected and with Rt[7]=1, the Vu+1, Vu+2, Vu+3 registers would be selected. The opcode based span bit 337 indicates the span of the VRF to choose based on the VU base register. For example, with the span bit 337 equal to "0", the Vu, Vu+1, Vu+2 registers would be selected and with a span bit 337 equal to "1", the Vu+1, Vu+2, Vu+3 registers would be selected.

The GP Rt address field 333 is forwarded across the data port 305 to the GP processor 306 where it is used to access the GP processor register file 307 which results in data selected at the GP Rt address (data@Rt) 334. The data@Rt 334 is forwarded across the data port 305 to the vector coprocessor 304 to be used by the alignment unit 314. In an alternative implementation, the VRF selection from the operand fetch unit 320 may be obtained from the data@Rt 334 value shared across the data port 305. The alignment unit 314 may be implemented with a plurality of multiplexers that select data elements identified by the vector alignment instruction, which includes the span bit field, in combination with the start location fetched from the GP processor and places the selected data elements in the specified aligned location as illustrated in the exemplary FIG. 1, 2A, or 2B.

Based on the requirements of the alignment instruction, two or four source register addresses are generated in the operand fetch unit 320 which are supplied to the vector register file (VRF) 310. The required source operands are read from the VRF 310. The alignment function operates on the supplied source operands as described, for example, with the alignment instructions of FIG. 1 and of FIG. 2A or FIG. 2B. The store circuit 316 selects the aligned results and passes them to the VRF 310 where the aligned data is written at the Vd/Vdd address or addresses generated by the result write unit 330. The store circuit 316 selects either a result from the alignment unit 314 or a result from the vector execution unit 315 based on instruction decode information identified by the instruction decode unit 309.

Figure 3B:
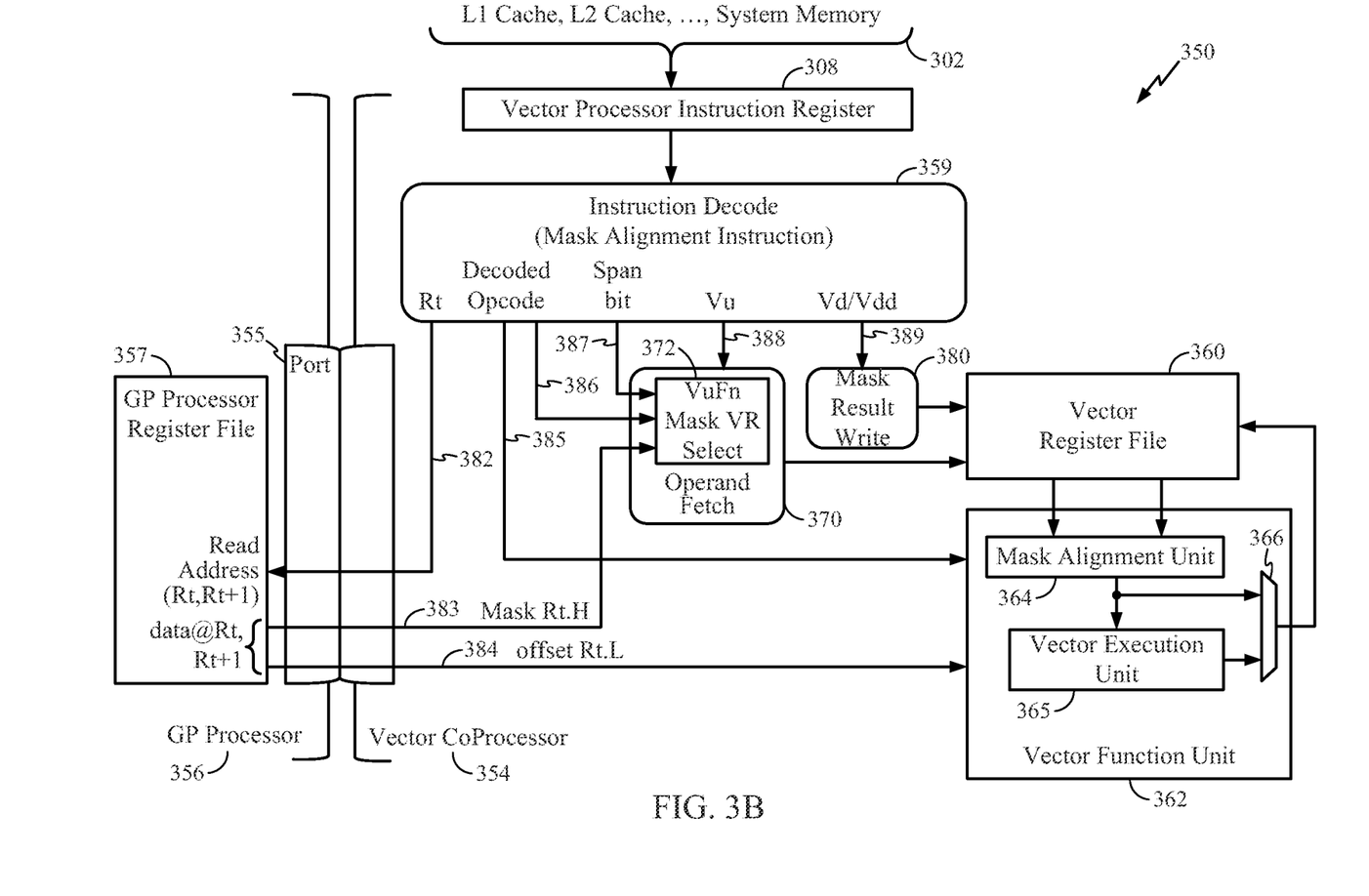
FIG. 3B illustrates an embodiment of a second alignment subsystem.

FIG. 3B illustrates an embodiment of a second alignment subsystem 350 that may be advantageously employed. The second alignment subsystem 350 includes a memory hierarchy 302, such as a level 1 (L1) cache, a L2 cache, L3 cache, system memory, a vector coprocessor 354, and a general purpose (GP) processor 356. The GP processor 356 includes a GP processor register file 357 and a portion of a data port 355 between the GP processor 356 and the coprocessor 354. The coprocessor 354 includes a vector processor instruction register 308, an instruction decode unit 359, a vector register file (VRF) 360, a vector function unit 362, an operand fetch unit 370, a result write unit 380, and a portion of the data port 355 between the coprocessor 354 and the GP processor 356. Contents of the GP register file 357 are shared between the GP processor 356 and the coprocessor 354 across the data port 355. The vector function unit 362 includes a mask alignment unit 364, a vector execution unit 365, and a store circuit 366 to select either a result from the mask alignment unit 364 or a result from the vector execution unit 365 and store the selected result in the VRF 360. The VRF 360 may be configured as a B×C-bit register file, where B=32 entries and C-bit=1024-bit (1 kb), for example.

In a second example for a 32 entry VRF, a 32-bit Rt.H 383 selected from the GP processor's register file 357 is set as a bit mask, where each enabled bit indicates a VRF address to be read, wherein bit zero corresponds to VRF address zero, bit one corresponds to VRF address one, and continuing up to bit thirty one corresponding to VRF address 31, for example. Also a 32-bit Rt.L 384 selected from the GP processor's register file 357 is set as an offset or start location. With the second alignment subsystem 350 in operation, an alignment instruction, such as the alignment instructions 104 of FIG. 1, 203 of FIG. 2A or 204 of FIG. 2B, is received in the vector instruction register 308. The received alignment instruction is decoded in the instruction decode unit 359 producing a plurality of decoded results which include a GP Rt address field 382, decoded operation codes 385 and 386, a span bit 387, such as Rt[7] as described with regard to FIGS. 2A and 2B, a Vu register address 388, and a Vd or Vdd register addresses 389. The GP Rt address field 382 is forwarded to the GP processor 356 where it is used to access the GP processor register file 357 which results in data@Rt=Rt.L an offset value and data@Rt+1=Rt.H the mask value. The Rt.H 383 mask value is forwarded across the data port 355 to the operand fetch unit 370 and the Rt.L 384 offset value or start address is forwarded to vector function unit 362. Based on the requirements of the alignment instruction and mask, a plurality of source register addresses are generated in the vector Vu function (VuFn) unit 372 which are supplied to the vector register file (VRF) 360. For example:

data@Rt+
1=Rt.H=0100_0000_1000_0000_0000_0000_
0000_0001

For the 32 entry VRF 360, each enabled bit in this mask indicates a VRF address to be read starting from register V0 corresponding to the least significant bit of the mask. In this exemplary mask where an enabled bit is a "1", VRF registers at V0, V23, and V30 are read. Up to 32 registers can be specified this way and the VRF 360 may not have enough read ports to accommodate this number of simultaneous read operations. Thus, as an alternative to having 32 read ports, a sequential set of operand read operations could be controlled by a state machine function in the coprocessor 354. For example, with two read ports, 16 sequential read operations may be provided to read the up to 32 registers if specified by 32 enabled mask bits and with four read ports, 8 sequential read operations may be provided. The required source operands are read from the VRF 360. The mask value may also be used to mask operations on the vector execution unit 362. The alignment function operates on the supplied source operands as described, for example, with the alignment instructions of FIG. 1 and of FIGS. 2A and 2B. The store circuit 366 selects the aligned results and passes them to the VRF 360 where the aligned data is written at the Vd/Vdd address or addresses generated by the result write unit 380. The store circuit 366 selects either a result from the alignment unit 364 or a result from the vector execution unit 365 based on instruction decode information identified by the instruction decode unit 359.

The vector Vu function (VuFn) unit 322 of FIG. 3A and the VuFn unit 372 of FIG. 3B may implement different sets of vector register addresses, such as a linear increment by one ordering, Vu, Vu+1, and Vu+2 as described with the second alignment function 200 of FIG. 2A and 201 of FIG. 2B. Also, other orderings may include a linear increment by two ordering, Vu, Vu+2, Vu+4, an increment by prime number ordering, Vu, Vu+3, Vu+5, such as a first set of registers Vu, Vu+P1, Vu+P2 and the second set of registers Vu+P1, Vu+P2, Vu+P3 where P1, P2, P3 are prime numbers specified by the alignment instruction to be in the range of accessible VRF registers, or other address ordering required by a particular alignment instruction, for example.

The alignment units 314 and 364 may be coupled, to the vector execution unit 315 and 365, respectively to allow fused alignment plus execution function operations which do not require having to first store an alignment result and refetch it from the VRF before it can be used, in a following execution function. A vector align and operate instruction may be used to specify such fused alignment and execute function. Operations may include select vector execution functions provided by the vector execution units 315 or 365.

The data port 305 and GP register file 307 of FIG. 3A or the data port 355 and the GP register file 357 of FIG. 3B provide exemplary means for sharing one or more register values accessed from the scalar register file in a first processor, such as the GP processor 306 or 356 with a second processor, such as the coprocessor 304 or 354. Also, the one or more registers values are accessed according to an Rt address 333 or 382 that is specified in a vector alignment instruction 104, 203, or 204 fetched in a vector processor instruction register 308, wherein a start location is determined from one of the shared register values.

The operand fetch unit 320 or 370, the vector register file (VRF) 310 or 360, and the alignment unit 314 or 364 provide exemplary means for aligning data in the second processor, the data identified, between the start location within a beginning Vu register of a vector register file (VRF) and an end location of a last Vu register of the VRF according to the vector alignment instruction, as illustrated for example in FIGS. 1, 2A, and 2B.

The instruction decode unit 309 or 359, the store circuit 316 or 366, and the VRF 310 or 360 provide exemplary means for selecting the aligned data from the alignment circuit and storing the aligned data in the vector register file according to an alignment store address specified by the vector alignment instruction.

Figure 4:
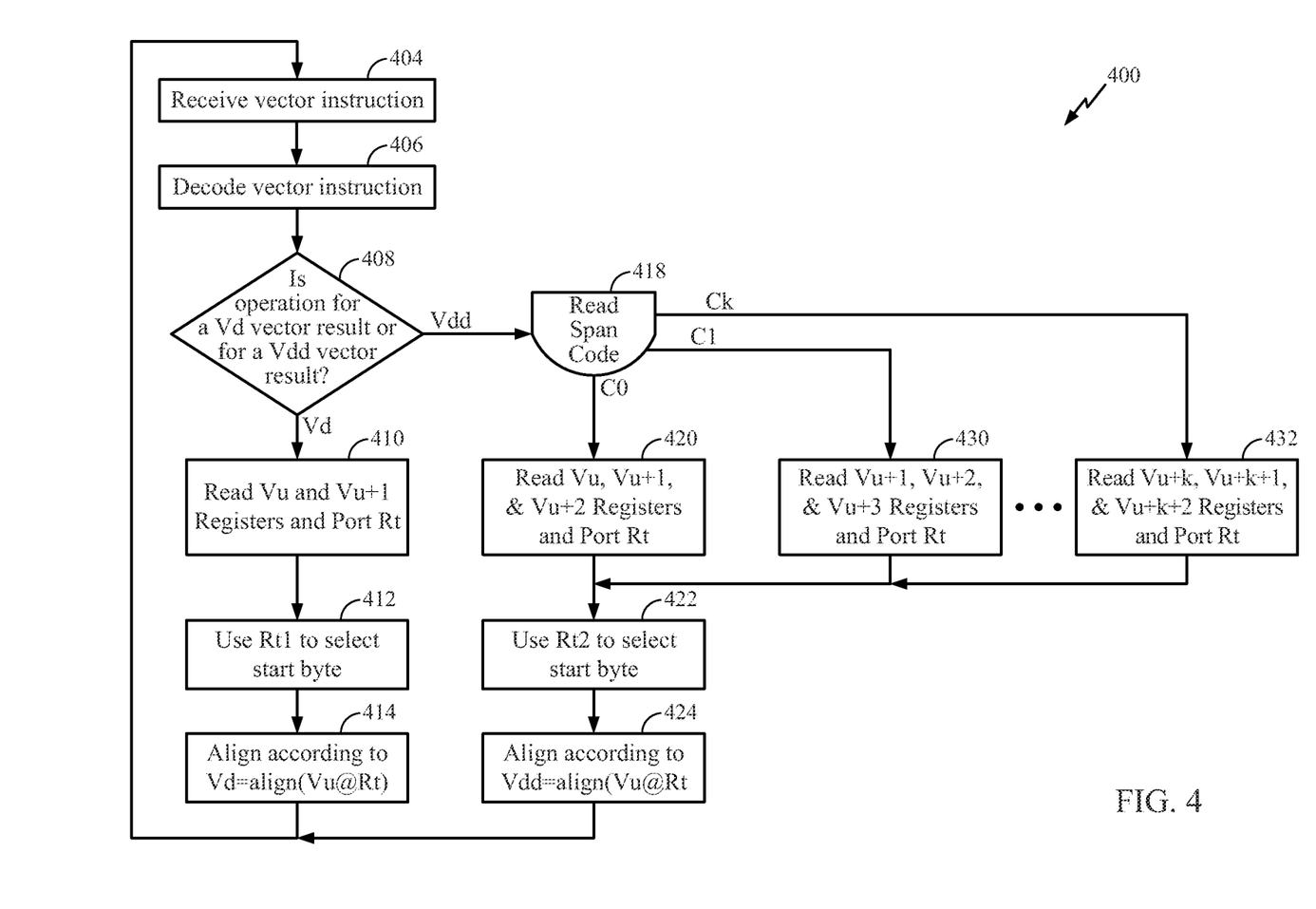
FIG. 4 illustrates an embodiment for a process of data alignment.

FIG. 4 illustrates an embodiment for a process of data alignment 400 that may be advantageously employed. Operations in the data alignment process 400 are associated with elements of FIGS. 1, 2A, 2B, 3A and 3B. At block 404, a vector alignment instruction is received in a vector processor instruction register, such as 308. At block 406, the received vector alignment instruction is decoded such as is done in instruction decode unit 309 or 359. At block 408, a determination is made whether the vector alignment instruction is for a Vd vector result as shown in FIG. 1 or for a Vdd vector result as shown in FIG. 2A or in FIG. 2B. If the decode indicates a Vd vector result is to be produced, the process 400 proceeds to block 410. At block 410, Vu and Vu+1 registers of the vector register file (VRF) and the port GP Rt register are read. At block 412, the data@Rt read for an Rt1 address is used as the start byte, such as "a50" 126 of FIG. 1. At block 414, the data in the Vu and Vu+1 registers are aligned according to Vd=align(Vu@RT) instruction 104 producing result Vd, such as shown in the Vd register 122 of FIG. 1. Then, the process 400 returns to block 404.

Returning to block 408, where a determination is made that a Vdd vector result is to be produced, the process 400 proceeds to block 418. At block 418, a case operation is determined. If the span bit is expanded to two or more bits, a plurality of register addresses may be specified. For example, a case zero (C0) is the same as a span bit having a value of 0, a case one (C1) is the same as a span bit having a value of 1, but further case address generation types may be specified, such as a plus two ordering for a C2 code, or a plus prime number ordering for a C3 code, or the like. If a C0 code is determined, the process 400 proceeds to block 420. At block 420, Vu, Vu+1, and Vu+2 registers and the port GP Rt register are read. At block 422, the data@Rt read for an Rt2 address is used as the start byte. At block 424, the data in the Vu, Vu+1, and Vu+2 registers are aligned according to Vdd=valign(Vu@RT) instruction 204 producing result Vdd. Then the process 400 returns to block 404.

Returning to block 418, where a C1 code is determined, the process 400 proceeds to block 430. At block 430, Vu+1, Vu+2, and Vu+3 registers and the port GP Rt register are read. At block 422, the data@Rt read for an Rt2 address is used as the start byte. At block 424, the data in the Vu+1, Vu+2, and Vu+3 registers are aligned according to Vdd=valign(Vu@RT) instruction 204 producing result Vdd, such as shown in the Vdd registers 222 and 224. Then the process 400 returns to block 404.

Returning to block 418, where a Ck code is determined, the process 400 proceeds to block 432. At block 432, Vu+k, Vu+k+1, and Vu+k+2 registers for example and the port GP Rt register are read, wherein k is specified by the alignment instruction to be an integer number greater than or equal to 1 and where Vu+k, Vu+k+1, and Vu+k+2 are within the capacity of the VRF. Other orderings of vector registers may be read, such as the previously described by two or by prime orderings or as required by a particular application. At block 422, the data@Rt read for an Rt2 address is used as the start byte. At block 424, the data in the Vu+k, Vu+k+1, and Vu+k+2 registers are aligned according to Vdd=valign (Vu@RT) instruction 204 producing result Vdd. Then the process 400 returns to block 404. Other possible register selections exist as determined by the span code at block 418 and as specified by the vector alignment instruction. For example, a first span code could be specified to select one of the register sets shown in blocks 420, 430, and 432 and a second span could be specified to select a different set of registers from the set selected by the first span code. For example, if a first set of registers Vu+k, Vu+k+1, and Vu+k+2 as illustrated in block 432 is selected by a first span code, then a different set of registers such as Vu+k+1, Vu+k+2, and Vu+k+3, not illustrated, could be chosen by a second span code for the second set of registers. In another example, a first set of registers Vu, Vu+1, Vu+2 as illustrated in block 420 could be selected by the span code C0 and a second set of registers Vu+k, Vu+k+1, Vu+k+2 as illustrated in block 432 could be selected by the span code Ck.

Figure 5:
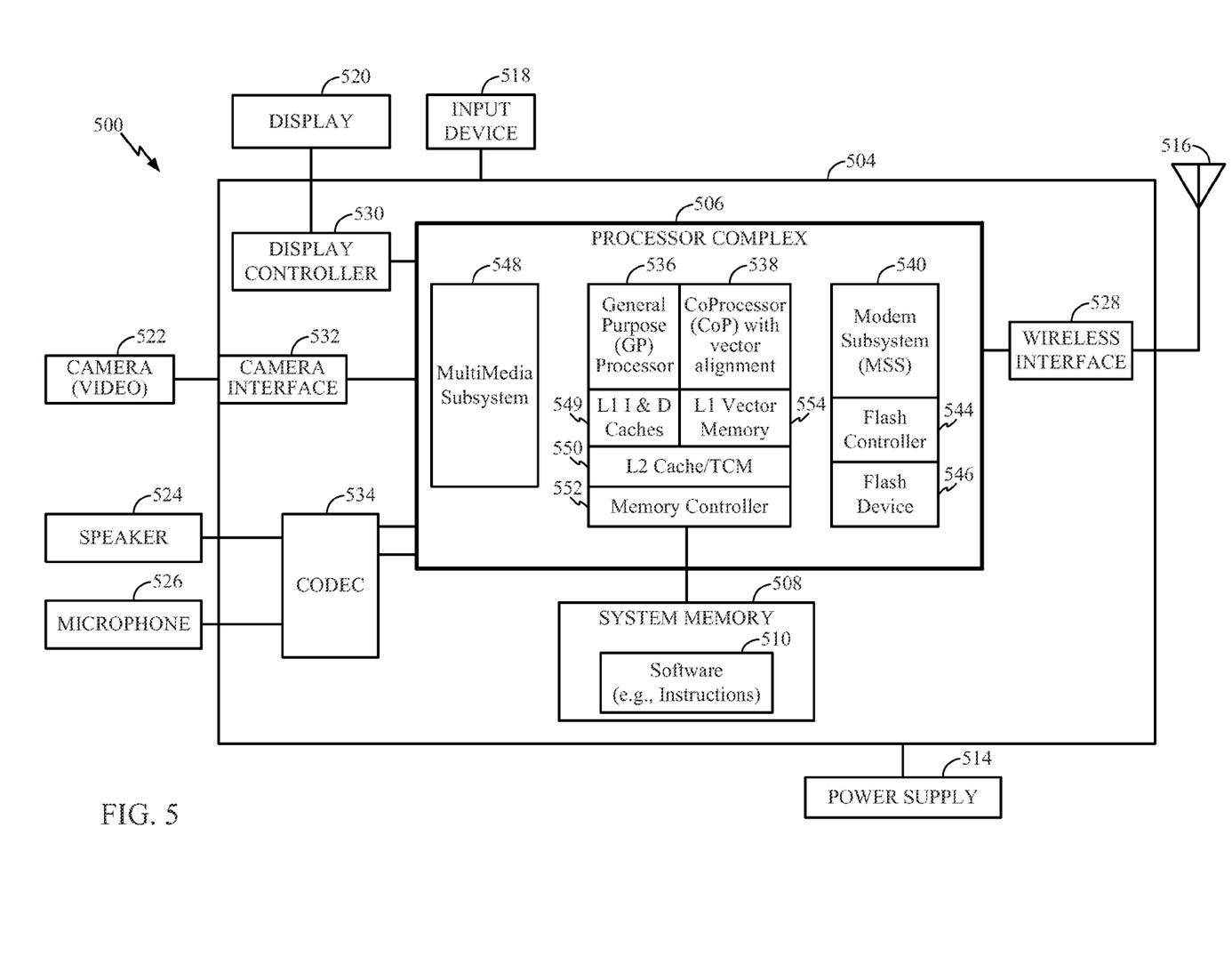
FIG. 5 illustrates a portable device having a central processing unit (CPU) and a coprocessor (CoP) such as a vector coprocessor configured to provide vector alignment functions and meet real-time requirements of the portable device.

FIG. 5 illustrates a portable device 500 having a general purpose (GP) processor 536 and a coprocessor (CoP) 538 such as a vector coprocessor configured to provide vector alignment functions and meet real time requirements of the portable device. The portable device 500 may be a wireless electronic device and include a system core 504 which includes a processor complex 506 coupled to a system memory 508 having software instructions 510. The portable device 500 comprises a power supply 514, an antenna 516, an input device 518, such as a keyboard, a display 520, such as a liquid crystal display LCD, one or two cameras 522 with video capability, a speaker 524 and a microphone 526. The system core 504 also includes a wireless interface 528, a display controller 530, a camera interface 532, and a codec 534. The processor complex 506 may include a dual core arrangement of the GP processor 536 having a local level 1 instruction cache and a level 1 data cache 549 and the coprocessor (CoP) 538 having a level 1 vector memory 554. The alignment function of the CoP 538 may correspond to the alignment functions of FIGS. 1-4. The processor complex 506 may also include a modem subsystem 540, a flash controller 544, a flash device 546, a multimedia subsystem 548, a level 2 cache 550, and a memory controller 552. The flash device 546 may include a removable flash memory or may also be an embedded memory.

In an illustrative example, the system core 504 operates in accordance with, any of the embodiments illustrated in or associated with FIGS. 1-4. For example, as shown in FIGS. 3A and 3B, the CoP 538 is configured to access program instructions stored in the memories of the L1 I & D caches, the L2 cache 550, and in the system memory 508 to provide the exemplary data alignment functions as illustrated in FIGS. 1 and 2.

The wireless interface 528 may be coupled to the processor complex 506 and to the wireless antenna 516 such that wireless data received via the antenna 516 and wireless interface 528 can be provided to the MSS 540 and shared with CoP 538 and with the GP processor 536. The camera interface 532 is coupled to the processor complex 506 and also coupled to one or more cameras, such as a camera 522 with video capability. The display controller 530 is coupled to the processor complex 506 and to the display device 520. The coder/decoder (CODEC) 534 is also coupled to the processor complex 506. The speaker 524, which may comprise a pair of stereo speakers, and the microphone 526 are coupled to the CODEC 534. The peripheral devices and their associated interfaces are exemplary and not limited in quantity or in capacity. For example, the input device 518 may include a universal serial bus (USB) interface or the like, a QWERTY style keyboard, an alphanumeric keyboard, and a numeric pad which may be implemented individually in a particular device or in combination in a different device.

The GP processor 536 and CoP 538 are configured to execute software instructions 510 that are stored in a non-transitory computer-readable medium, such as the system memory 508, and that are executable to cause a computer, such as the dual core processors 536 and 538, to execute a program to provide data alignment functions as illustrated in FIGS. 1 and 2. The GP processor 536 and the CoP 538 are configured to execute the software instructions 510, such as Vd=valign(Vu@Rt) and Vdd=valign(Vu@Rt) which calculates the variable Rt, which may also correspond to Rt.H and Rt.L, on the GP processor 536 and shares the GP Rt data value or values with the CoP 538. The software instructions are accessed from the different levels of cache memories, such as the L1 instruction memory 549, and the system memory 508.

In a particular embodiment, the system core 504 is physically organized in a system-in-package or on a system-on-chip device. In a particular embodiment, the system core 504, organized as a system-on-chip device, is physically coupled, as illustrated in FIG. 5, to the power supply 514, the wireless antenna 516, the input device 518, the display device 520, the camera/s 522, the speaker 524, the microphone 526, and may be coupled to a removable flash device 546.

The portable device 500 in accordance with embodiments described herein may be incorporated in a variety of electronic devices, such as a set top box, an entertainment unit, a navigation device, a communications device, a personal digital assistant (PDA), a fixed location data unit, a mobile location data unit, a mobile phone, a cellular phone, a computer, a portable computer, tablets, a monitor, a computer monitor, a television, a tuner, a radio, a satellite radio, a music player, a digital music player, a portable music player, a video player, a digital video player, a digital video disc (DVD) player, a portable digital video player, any other device that stores or retrieves data or computer instructions, or any combination thereof.

The various illustrative logical blocks, modules, circuits, elements, or components described in connection with the embodiments disclosed herein may be implemented or performed with a general purpose processor, a digital signal processor (DSP), an application specific integrated circuit (ASIC), a field programmable gate array (FPGA) or other programmable logic components, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, for example, a combination of a DSP and a microprocessor, a plurality of microprocessors, one or more microprocessors in conjunction with a DSP core, or any other such configuration appropriate for a desired application.

The dual core processors 536 and 538 of FIG. 5, for example, may be configured to execute instructions to data alignment functions in the multiprocessor system in order to service a real time task under control of a program. The program stored on a computer readable non-transitory storage medium either directly associated locally with processor complex 506, such as may be available through the instruction cache 549, or accessible through a particular input device 518 or the wireless interface 528. The input device 518 or the wireless interface 528, for example, also may access data residing in a memory device either directly associated locally with the processors, such as the processor local data caches, or accessible from the system memory 508. The methods described in connection with various embodiments disclosed herein may be embodied directly in hardware, in a software module having one or more programs executed by a processor, or in a combination of the two. A software module may reside in random access memory (RAM), dynamic random access memory (DRAM), synchronous dynamic random access memory (SDRAM), flash memory, read only memory (ROM), erasable programmable read only memory (EPROM), electrically erasable programmable read only memory (EEPROM), hard disk, a removable disk, a compact disk (CD)-ROM, a digital video disk (DVD) or any other form of non-transitory storage medium known in the art. A non-transitory storage medium may be coupled to the processor such that the processor can read information from, and write information to, the storage medium. In the alternative, the storage medium may be integral to the processor.

While the invention is disclosed in the context of illustrative embodiments for use in processor systems, it will be recognized that a wide variety of implementations may be employed by persons of ordinary skill in the art consistent with the above discussion and the claims which follow below. For example, a fixed function implementation may also utilize various embodiments of the present invention.

What is claimed is:

1. A method for executing a vector alignment instruction, the method comprising:
    accessing a start location on a first processor from a register in a scalar register file that is shared between the first processor and a second processor;
    aligning on the second processor a set of data values that begins at the start location within a register of a vector register file (VRF) to be stored as a set of aligned data values at a target register in the VRF; and
    storing the set of aligned data values at the target register in the VRF.

2. The method of claim 1, wherein the register in the scalar register file and the target register are specified in the vector alignment instruction and the register of the VRF is indirectly identified by a value stored in a vector unit (Vu) base register.

3. The method of claim 1, wherein a span bit selects a first register of a first group of registers in the VRF or a second register of a second group of registers in the VRF as the register of the VRF.

4. The method of claim 3, wherein the span bit is the most significant bit of the start location.

5. The method of claim 3, wherein the first register of the first group of registers is identified by a Vu field in the vector alignment instruction with the other registers in the first group of registers identified according to an instruction specified ordering of registers.

6. The method of claim 1, wherein the first processor is a general purpose (GP) processor and the second processor is a single instruction multiple data (SIMD) vector processor.

7. The method of claim 1, wherein the register in the scalar register file is shared through a data port assigned to the second processor, allowing the accessing of the start location to occur without affecting operations on the first processor.

8. The method of claim 1 further comprising:
accessing a span bit and the start location from a value generated on the first processor, stored in the register in the scalar register file of the first processor, and shared between the first processor and the second processor; and
aligning on the second processor the set of data values that begins at the start location within a set of registers of the vector register file (VRF) to be stored as the set of aligned data values at the target set of registers of the VRF, wherein the set of registers of the VRF is selected as a first set of registers or a second set of registers based on the span bit.

9. The method of claim 8, wherein the first set of registers is a set of three registers in a linear plus one ordering beginning at a Vu identified register and the second set of registers is a set of three registers in a linear plus k plus one ordering beginning at a Vu+k identified register, and k is specified by the alignment instruction to be an integer greater than or equal to 1.

10. The method of claim 8, wherein the first set of registers is a set of three registers in a linear plus two ordering beginning at a Vu identified register and the second set of registers is a set of three registers in a linear plus k plus two ordering beginning at a Vu+k identified register, and k is specified by the alignment instruction to be an integer greater than or equal to 1.

11. The method of claim 8, wherein the first set of registers is Vu, Vu+P1, Vu+P2, the second set of registers is Vu+P1, Vu+P2, Vu+P3, and P1, P2, P3 are prime numbers specified by the alignment instruction to be in the range of accessible VRF registers.

12. A method for executing a vector align and operate instruction, the method comprising:
accessing a start location generated on a first processor from a register in a scalar register file that is shared between the first processor and a second processor;
aligning on the second processor a set of data values that begins at the start location within a register of a vector register file (VRF) to generate a set of aligned data values; and
operating on the aligned data values according to the vector align and operate instruction to generate a result stored at a target register of the VRF.

13. The method of claim 12, wherein the register in the scalar register file is shared through a data port assigned to the second processor, allowing the accessing of the start location to occur without affecting operations on the first processor.

14. The method of claim 12, wherein the register in the scalar register file and the target register are specified in the vector align and operate instruction and the register of the VRF is indirectly identified by a value stored in a vector unit (Vu) base register.

15. A method for executing a vector mask alignment instruction, the method comprising:
accessing a mask and a start location generated on a first processor from a first register and a second register in a scalar register file that is shared between the first processor and a second processor;
applying the mask to identify a set of registers of a vector register file (VRF) on the second processor according to enabled bits in the mask;
aligning on the second processor a set of data values that begins at the start location within the identified set of registers of the VRF to be stored as a set of aligned data values at a target set of registers of the VRF; and
storing the set of aligned data values at the target set of registers of the VRF.

16. The method of claim 15, wherein the first register and the second register are shared through a data port assigned to the second processor, allowing the accessing of the mask and the start location to occur without affecting operations on the first processor.

17. An apparatus for executing a vector alignment instruction, the apparatus comprising:
a scalar register file associated with a first processor configured to share one or more register values with a second processor, the one or more register values accessed from the scalar register file according to an Rt address specified in a vector alignment instruction;
an alignment circuit in the second processor configured to align data identified within a plurality of registers of a vector register file (VRF) according to the vector alignment instruction and an alignment start location determined from the one or more register values; and
a store circuit configured to select the aligned data from the alignment circuit and store the aligned data in the vector register file according to an alignment store address specified by the vector alignment instruction.

18. The apparatus of claim 17, wherein the start location is within a beginning register of the plurality of registers.

19. The apparatus of claim 17, wherein a double alignment instruction specifies a span code selected from the one or more register values to identify a first set of registers or a second set of registers of the VRF according to a state of the span code.

20. The apparatus of claim 17, wherein a mask alignment instruction specifies a mask selected from the one or more register values to identify an alignment of data stored in one or more registers selected from the VRF according to one or more enabled bits in the mask.

21. The apparatus of claim 17, wherein the one or more register values accessed from the scalar register file in the first processor are shared through a data port assigned to the second processor, allowing the accessing of the register values to occur without affecting operations on the first processor.

22. A computer readable non-transitory medium encoded with computer readable program data and code, the program data and code when executed operable to:
access a start location on a first processor from a register in a scalar register file that is shared between the first processor and a second processor;
align on the second processor a set of data values that begins at the start location within a register of a vector register file (VRF) to be stored as a set of aligned data values at a target register in the VRF; and
store the set of aligned data values at the target register in the VRF.

23. An apparatus for executing a vector alignment instruction, the apparatus comprising:
means for sharing one or more register values accessed from a scalar register file in a first processor with a second processor, the one or more registers values accessed according to an Rt address specified in a vector alignment instruction, wherein a start location is determined from one of the shared register values;

means for aligning data in the second processor, the data identified between the start location within a beginning Vu register of a vector register file (VRF) and an end location of a last Vu register of the VRF according to the vector alignment instruction; and means for selecting the aligned data from the alignment circuit and storing the aligned data in the vector register file according to an alignment store address specified by the vector alignment instruction.

* * * * *